United States Patent [19]
Vaidyanathan et al.

[11] Patent Number: 5,654,113
[45] Date of Patent: Aug. 5, 1997

[54] PROTONATED CATHODE BATTERY

[75] Inventors: Hariharan Vaidyanathan, North Potomac; Martin W. Earl, Silver Spring, both of Md.

[73] Assignee: Comsat Corporation, Bethesda, Md.

[21] Appl. No.: 483,224

[22] Filed: Jun. 7, 1995

[51] Int. Cl.⁶ .............................................. H01M 10/40
[52] U.S. Cl. ..................... 429/192; 429/223; 429/59; 252/62.2
[58] Field of Search ............................ 429/192, 223, 429/59; 252/62.2; 420/900

[56] References Cited

U.S. PATENT DOCUMENTS

| | | | |
|---|---|---|---|
| 4,051,305 | 9/1977 | Benczur-Urmossy et al. | 429/223 |
| 4,605,603 | 8/1986 | Kanda et al. | 429/59 |
| 4,621,034 | 11/1986 | Kanda et al. | 429/59 |
| 4,636,445 | 1/1987 | Yamano et al. | 429/59 |
| 4,664,761 | 5/1987 | Zupancic et al. | 429/192 |
| 4,847,174 | 7/1989 | Palmer et al. | 429/112 |
| 4,894,301 | 1/1990 | Dyer | 429/193 |
| 4,916,033 | 4/1990 | Gourdine | 429/49 |
| 4,977,045 | 12/1990 | Mohri | 429/192 |
| 5,030,527 | 7/1991 | Carpio et al. | 429/192 |
| 5,096,561 | 3/1992 | Akhtar | 429/192 |
| 5,102,753 | 4/1992 | Rossoll et al. | 429/192 |
| 5,320,716 | 6/1994 | Akhtar | 204/59 R |
| 5,342,710 | 8/1994 | Koksbang | 429/192 |
| 5,429,759 | 7/1995 | Andrieu et al. | 252/62.2 |

OTHER PUBLICATIONS

Linden, editor "Handbook of Batteries and Fuel Cells", McMillian Book Company, pp. 2–1 through 2–8 (no month) 1984.

Ovshinsky, et al., "A Nickel Metal Hydride Battery for Electric Vehicles", Science, Apr. 9, 1993, vol. 260, pp. 176–181.

Libowitz, "Proceedings of the Symposium on Hydrogen Storage Materials, Batteries and Electrochemistry", Phoenix, AZ, 1991, The Electrochemical Society, vol. 92–5, pp. 3–23, 1992. (no month).

Morrison, et al., "Organic Chemistry", New York University, Third Edition, pp. 20–21 and 32–35, 1979. (no month).

Bocarsly, et al., "Proceedings of the Symposium On Nickel Electrode", Denver, CO, 1981, The Electrochemical Society, vol. 82–4, pp. 97–117, 1982. (no month).

Cornilsen, et al., "Proceedings of the Symposium On Nickel Hydroxide Electrode", Hollywood, FL, 1989, The Electrochemical Society, vol. 90–4, pp. 82–96, 1990. (no month).

Stefano Passerini, et al., "Laminated Electrochromic Windows Based On Nickel Oxide, Tungsten, Oxide, and Gel Electrolytes", The Electrochemical Society, vol. 141, No. 4, pp. 1025–1028, Apr. 1994.

Vilche, et al., "Proceedings of the Symposium On Nickel Electrode", Denver, 1981, The Electrochemical Society, vol. 82–4, pp. 19–47, 1982. (no month).

Lassègues, et al., Solid State Ionics, Editors: M. Balkanski, J. Takashi and H.L. Tuller, North Holland, New York, pp. 443–448, 1992. (no month).

*Primary Examiner*—Prince Willis, Jr.
*Assistant Examiner*—Carol Chaney
*Attorney, Agent, or Firm*—Sughrue, Mion, Zinn, Macpeak & Seas

[57] ABSTRACT

A rechargeable electrochemical battery having a solid organic electrolyte and a thin film cathode and anode. In particular, the battery employs a proton-conducting organic polymer which is a mixture of a strong acid and a base polymer, a thin film anode containing a hydride alloy, and a thin film cathode containing a $NiO_x$ active material. The battery is rechargeable and capable of fast discharging and recharging. Further, the battery can be hermetically sealed in a case.

23 Claims, 2 Drawing Sheets

4,654,113

PROTONATED CATHODE BATTERY

BACKGROUND OF THE INVENTION

1. Field of the Invention

The invention relates to a rechargeable electrochemical battery having a solid electrolyte and a thin film cathode and anode. In particular, the battery employs a proton-conducting organic polymer which is a mixture of a strong acid and a base polymer, a thin film anode containing a hydride alloy, and a thin film cathode containing $NiO_x$ active material. The battery is rechargeable and capable of fast discharging and recharging.

2. Description of the Related Art

Conventional aqueous Ni-MH batteries have at least three main disadvantages. Namely, such batteries deliver a relatively low amount of energy, such as 60 Wh/Kg and 120 Wh/L at the cell level, they produce oxygen gas during charge, and they have poor design flexibility.

Conventional Ni-MH batteries employ an alkaline liquid electrolyte to carry protons between very thick anodes and cathodes, which induces a valency change in the nickel, and a subsequent chemical change releases energy. The cell reaction for a conventional Ni-MH battery upon discharge is:

$$NiOOH + MH \rightarrow Ni(OH)_2 + M$$

Since aqueous electrolytes are used in conventional Ni-MH batteries, generation of oxygen and hydrogen accompanies the valency change in Ni, according to the following reaction:

$$H_2O + e \rightarrow \frac{1}{2} H_2 + OH^-$$

$$4 OH^- \rightarrow 2H_2O + O_2 + 4e$$

The generated oxygen and hydrogen can be in gaseous form, thus constraining the design of the battery. For example, vessel design, seals and safety vents, as well as material selection are aspects that must be considered in order to accommodate the generated gases, which can lead to an increase in the mass of the battery. Accordingly, conventional alkaline Ni-MH batteries only deliver a fraction of the theoretical energy based on the mass of the components of the battery, because of the need to accommodate the gases that are generated.

While batteries using solid electrolytes have been constructed, as opposed to using aqueous electrolytes, such batteries suffer from a number of problems. For example, a Na/S/beta alumina electrolyte is known which is based on sodium ion conduction through aluminum oxide. However, batteries using such an electrolyte require a high operating temperature, e.g., 400° C., and hence, have been abandoned as impractical.

Silver rubidium iodide and lithium/PbI batteries are are examples of other batteries, in which ion conduction occurs through solids. However, such batteries are not rechargeable.

Batteries employing lithium/polyethylene, oxide-$LiCF_3SO_3$/cobalt oxide and variations thereof, are also known. While such batteries have a specific energy of 130 Wh/Kg and neither contain liquids nor produce gas, they operate best at an elevated temperature, such as 60° C., due to the polymer's poor conductivity at room temperature. Furthermore, the lithium ion conduction in such media is slower than that of protons, because a lithium ion is larger than a proton, and because of the formation of ion-pairs. Therefore, since ion conduction is rather slow, such batteries cannot be charged or discharged at high rates.

The Ni-MH solid state battery is a logical extension of the findings of Stefano Passerini, Bruno Scrosati and Vincent Hermann which were published in the Journal of Electrochemical Society Vol. 141, pp. 1025–28, April 1994 page 1025 regarding proton conduction and subsequent charge transfer reaction in an electrochromic device, rather than in a battery, containing a $NiO_x$ cathode, proton conductor and $WO_3$ anode. Further, Masud Aktar refers to a solid state Ni-MH battery in U.S. Pat. No. 5,320,716, dated Jun. 14, 1994, at col. 12, which uses a hydride forming alloy, a proton conductor and $Ni(OH)_2$ cathode. However, Aktar's invention requires hydrogen gas for use as a proton reservoir in the battery which creates problems in hermetically sealing such a battery.

SUMMARY OF THE INVENTION

An object of the invention is to produce a rechargeable Ni-MH battery that does not produce gas, in order to provide packaging flexibility and to permit it to be hermetically sealed. Furthermore, it is an object of the invention to provide increased specific and volumetric energies over aqueous Ni-MH batteries, and a higher current rate discharge capability than lithium polymer batteries. Moreover, it is an object of the invention to provide a battery that has a high cycle life (large number of charge/discharge cycles), and an extremely low self-discharge rate.

The invention achieves the above objects by employing a proton-conducting solid organic electrolyte formed from an acid-polymer blend of a strong acid mixed with a organic polymer base, and employing a thin film $NiO_x$ cathode and a thin film metal hydride anode.

BRIEF DESCRIPTION OF THE DRAWINGS

A complete understanding of the present invention can be gained from the detailed description, set forth below, with reference to the following drawings, in which.

DETAILED DESCRIPTION OF A PREFERRED EMBODIMENT

A preferred embodiment of the present invention is described below in more detail with reference to the above drawings.

The present invention relates to a battery which exploits the proton conducting properties of organic sulfonate polymers. The battery, shown in FIG. 1, has a positive electrode, or cathode 10, formed from a material, a negative electrode, or an anode 20, formed from a metal hydride, and a proton-conducting solid organic electrolyte 14, disposed between the cathode and anode.

The proton-conducting solid organic electrolyte 14 is made of an acid-polymer blend. This acid-polymer blend is a compound formed when an organic base polymer, which is an organic equivalent of an alkali, is mixed with a strong acid having a high ionization constant, such as sulfuric or phosphoric acid (e.g., sulfuric acid or orthophosphoic acid can be used as the strong acid). The electrolyte's proton conduction properties arise from the acid portion of the blend, as the acid-polymer blend contains both protons and polymeric anions. The acid is preferably dissociated completely, or as close to 100% as possible in a pure state and not in an aqueous solution. Since the acid-polymer is ionized, it is unnecessary to dissolve an inorganic salt in the electrolyte in order to produce ions.

The proportions for the blend depend on the protonation required. In the base polymer there are a fixed number of base sites (e.g. mine, OH) which are points for attachment of the inorganic acid group, e.g. $HSO_4$, when sulfuric acid is used. When 20% of the base sites are neutralized with the inorganic acid group the proton conductivity sets in. Neutralizing all the base sites is not desirable since the structure may become too absorbent towards moisture. The proportion is adjusted so that approximately 50% of the base sites are neutralized.

Also, several organic polymers can be used in forming the acid-polymer blend, which have structures providing for good conductivity and stability. These polymers include polyethyleneimine, polyvinylpyridine, polyacrylamide, poly 2-vinyl pyridine, and polyvinylpyrrolidine. Further, the present invention is not limited to such organic polymers. Other inert structures shaped in an appropriate form to hold the proton conducting electrolyte could also be used. However, the nature of the polymer structure is of secondary importance since the conductivity depends on the ionization constant of the inorganic acid used.

Figure 2A:
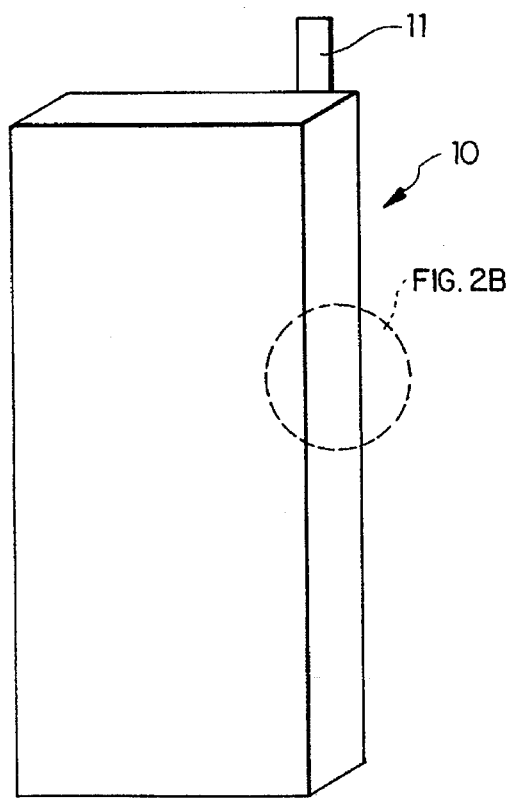
FIG. 2 shows a cathode of the battery, including a detail of the interface between the cathode and the solid electrolyte.
Figure 2B:
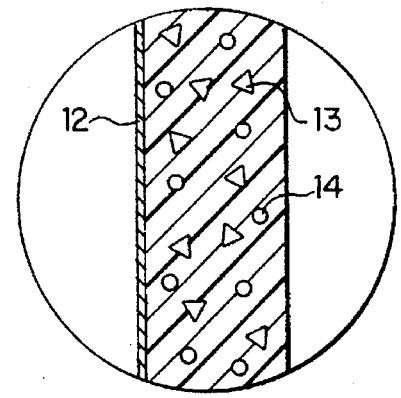

The battery also contains a cathode 10, an example of which is shown in FIG. 2. The cathode 10 consists of a thin-film of $NiO_x$ disposed on a substrate. By employing a thin film cathode, the dominant resistance is kept low. That is, the resistance to the movement of protons in and out of the $NiO_x$ structure decreases with reduction in the cathode thickness. Here, the $NiO_x$ thin film preferably has a thickness in the range of 1000–4000 Å, and the substrate has a thickness of 10–25 microns. Although cathodes having larger thickness may operate, the desired results occur with use of thin-films having thicknesses within the above ranges. The substrate may be a nickel substrate having, for example, a thickness of 10 μm and the $NiO_x$ thin film can be applied by a sputtering process.

After the thin film of $NiO_x$ is formed on the substrate, the cathode 10 is impregnated with the proton-conducting solid organic electrolyte 14 described above, so that particles of the electrolyte 14 are held in close proximity to the $NiO_x$ film 13 of the cathode, as shown in FIG. 2. The cathode can be impregnated by repeatedly dipping and drying the cathode in a solution of the acid-polymer blend. A final thickness of the impregnated cathode 10, as shown in FIG. 2, is preferably between 0.002 cm and 0.005 cm.

Alternatively, the $NiO_x$ layer can be produced by thermally decomposing a nickel carbonyl thin nickel foil in an oxygen atmosphere. The corresponding reaction is:

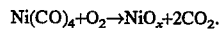

Following the thermal decomposition, the cathode is impregnated with the proton-conducting solid organic electrolyte 14, as described above.

Figure 3A:
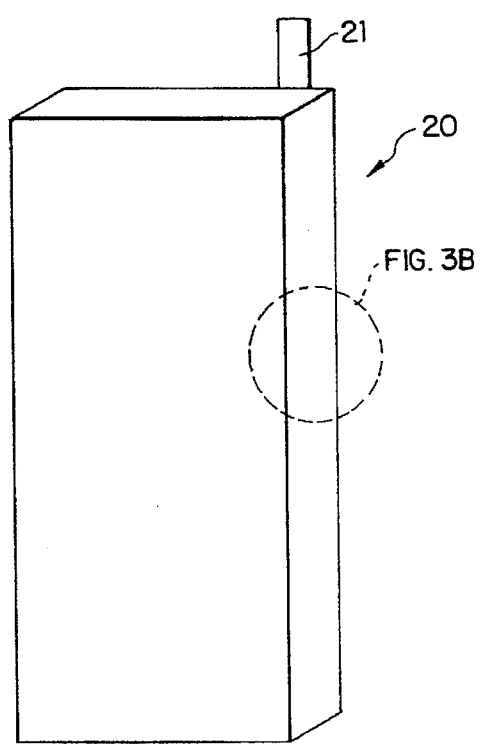
FIG. 3 shows an anode of the battery, including a detail of the interface between the anode and the solid electrolyte.
Figure 3B:
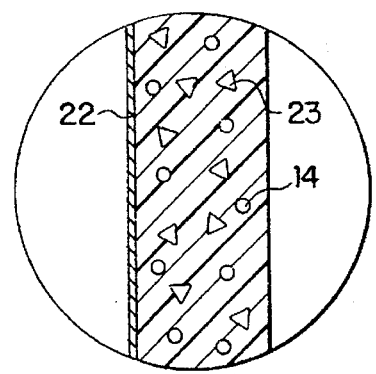

The anode 20, shown in FIG. 3, also employs a thin film and can be formed from a nickel substrate 22, such as a thin foil of nickel coated with a commercially available hydride alloy 23. Other materials, such as aluminum, can be used for the substrate in order to achieve a lightweight anode. The hydride alloy 23 can contain, for example, Ni, Ti, Zr, La, Si, etc. as constituent components. The alloy is selected based on the amount of hydrogen it can absorb, and will typically provide sufficient absorption to provide a charge capacity of approximately 300 mAh/gram. For example, an alloy containing 18% V, 15% Ti, 18% Zr, 29% Ni, 5% Cr and 15% Fe, Mn or Co has been successfully used by others in an aqueous Ni-MH battery, which could also be used in the present battery.

The hydride alloy 23 of anode 20 is also selected on the basis of the plateau pressure of the alloy. A hydride alloy having a very low plateau pressure is preferable, having, for example, an upper limit of 0.3 atmospheres. Other factors in selecting the hydride alloy 23 include its high stability, corrosion tolerance, mechanical strength, and structural integrity, each being equally important.

The anode 20 is impregnated with the proton-conducting solid organic electrolyte in a similar manner to the cathode, described above.

In an another embodiment, a porous protection member, such as a porous plastic layer, is inserted between the cathode and the proton-conducting organic solid organic electrolyte. The plastic layer is used as an insulator to prevent short circuits. It also provides for physical protection of the thin film cathode, yet is porous to facilitate conduction of protons, and hence, reduces mass transfer polarization. The plastic layer has a thickness of about 25–50 microns.

The charging reaction in the battery occurs according to the following formula, in which x, y, and n are real numbers.

Upon charging, the $NiO_x$ disposed on the cathode becomes $NiO_xH_y$. The discharge reaction occurs in the opposite direction of the above formula. During a discharge reaction, the battery produces $NiO_xH_y$. Also, during the charging reaction an oxidized nickel species having a valence of 3.7–4.0 is produced, which allows for achieving a large specific energy. Furthermore, the battery does not produce oxygen on charge or discharge, and hence, can be hermetically sealed.

The performance of the battery is comparable to an alkaline battery, with an operating voltage of 1.23 volts. Further, the battery has a lower self-discharge rate and a higher charge and discharge rate than an alkaline battery. Also, the end of charge voltage is higher than that of an aqueous Ni/MH battery, and increases with continued charging. Moreover, the battery delivers a specific energy of 130–150 Wh/kg and specific power of 180 Wh/l.

Figure 1:
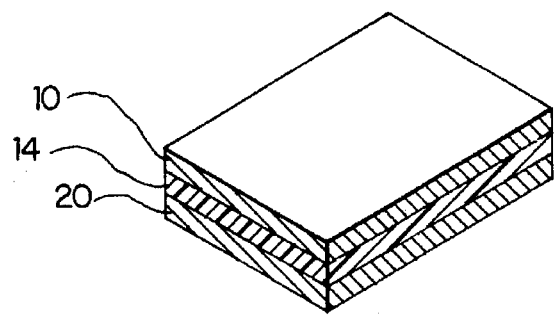
FIG. 1 shows an embodiment of the solid state battery in which the battery is formed as a flat plate.
Figure 4:
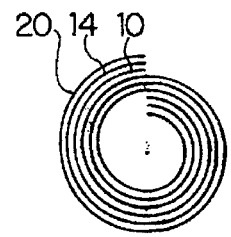
FIG. 4 shows a top view of an embodiment of the solid state battery in which the battery components are coiled.
Figure 5:
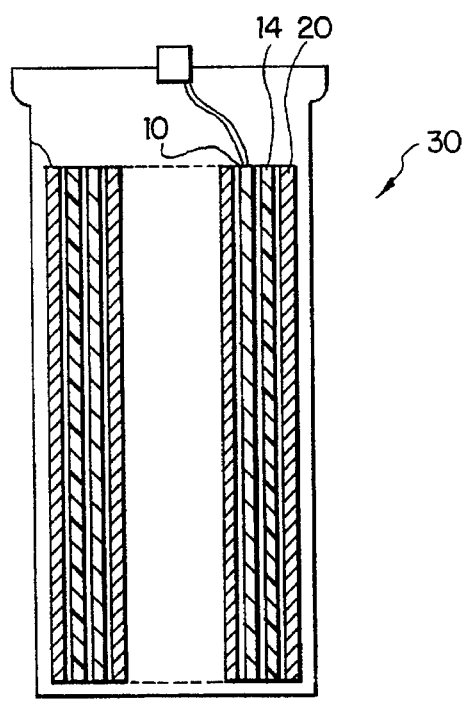
FIG. 5 shows a side cross sectional view of the solid state battery having coiled components.

The active elements of the battery, that is, the cathode 10, anode 20 and proton-conducting solid organic electrolyte 14, which are described above, can be configured and packaged in a variety of manners. For example, they can be formed as a flat plate, as shown in FIG. 1, or wound in a coil, as shown in FIG. 4. Further, the active elements can be packaged in a prismatic manner. Also, several cells, each comprised of an cathode, anode, and proton-conducting solid organic electrolyte, can be encapsulated together in a single container in a bipolar configuration. Since the battery produces neither oxygen nor hydrogen gas on either charge or overcharge, the active elements can be configured in a plastic or metallic container 30, as shown in FIG. 5. Thus, the battery allows for a great degree of packaging design flexibility.

The present invention has been described in connection with preferred embodiments, and is not intended to be limited only to the above-described embodiments. For example, the battery can be formed having a sputtered $NiO_x$ cathode, a polyvinylpyrrolidine-$H_3PO_4$ solid electrolyte, and an AB4 hydride alloy anode. Mother embodiment of the battery has a carbonyl decomposed $NiO_x$ cathode, a PVP-$H_3PO_4$ solid electrolyte, and a AB4 alloy for use in the anode. Still another embodiment of the battery has a sputtered $NiO_x$ cathode, a PVP-$H_2SO_4$ solid electrolyte, and an anode made of a hydride alloy. Another example of a solid organic electrolyte for use in the present invention is a polyvinyl alcohol and sulfuric acid blend.

The present invention has been described in connection with the preferred embodiments, and is not intended to be limited only to the above-described embodiments. Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A battery comprising:
   a cathode comprised of an electro-active material;
   a metal hydride (MH) anode; and
   a proton-conducting solid organic electrolyte, disposed between the cathode and the anode, wherein said cathode provides a proton to said proton-conducting solid organic electrolyte during a battery charging operation, and the valency of the electro-active material of said cathode is changed upon charging and discharging the battery, wherein said proton-conducting solid organic electrolyte is a nonaqueous electrolyte.

2. The battery as recited in claim 1, wherein said cathode is comprised of $NiO_x$ prior to charging the battery, and $NiO_xH_y$ after charging begins, wherein $1<x<2$ and $1<y<2$ and wherein said compound $NiO_xH_y$ is a distinct chemical species having a different valency and having hydrogen chemically bonded to the nickel.

3. The battery as recited in claim 1, wherein the electrolyte is disposed in contact with the cathode and the anode such that the solid organic electrolyte is impregnated into each.

4. The battery as recited in claim 1, wherein a porous protective member is disposed between the cathode and the solid organic electrolyte such that the solid organic electrolyte is impregnated into the protective member.

5. The battery as recited in claim 1, wherein the cathode has a thin-film of $NiO_x$ disposed thereon, wherein $0.1<x<1$.

6. The battery as recited in claim 1, wherein the metal hydride anode is comprised of an alloy which protonates and deprotonates without generating hydrogen gas.

7. The battery as recited in claim 1, wherein a discharge reaction of the battery produces $NiO_xH_y$ wherein x and y are real numbers within the ranges $1<x<2$ and $1<y<2$.

8. The battery as recited in claim 1, having a discharge reaction according to the following formula: $MH_n + NiO_xH_{y-n} \rightarrow M + NiO_xH_y$, wherein M is a hydride alloy, $1<x<2$ and $1<y<2$, and n is less than y.

9. The battery as recited in claim 1, wherein the proton-conducting solid organic electrolyte is comprised of:
   an organic base polymer; and
   an acid having a high ionization constant, wherein a molecule of said acid is ionized into a proton and an organic anion, said acid is dissociated in a pure state, and the high ionization constant of said acid is greater than or equal to an ionization constant of one of sulfuric acid and orthophosphoic acid.

10. The battery as recited in claim 9, wherein said acid is one of sulfuric acid and orthophosphoic acid.

11. The battery as recited in claim 9, wherein the organic base polymer is one of polyethyleneimine, polyvinylpyridine, polyacrylamide, poly 2-vinyl pyridine, and polyvinylpyrrolidine.

12. The battery as recited in claim 1, wherein the battery does not produce oxygen on either charge and overcharge.

13. A method for constructing a battery comprising the steps of:
   disposing a thin-film of $NiO_x$ on a substrate to form a cathode;
   forming a metal hydride anode from a multiphase alloy; and
   blending an acid having a high ionization constant with an organic base polymer to form a proton-conducting solid organic electrolyte, wherein said proton-conducting solid organic electrolyte is a nonaqueous electrolyte and the ionization constant of said acid is greater than or equal to an ionization constant of one of sulfuric acid and orthophosphoric acid;
   disposing said proton-conducting solid organic electrolyte between said cathode and said anode, wherein $0.1<x<1$.

14. The method recited in claim 13, wherein the thin-film of $NiO_x$ is disposed on the cathode by sputtering, wherein $0.1<x<1$.

15. The method recited in claim 13, wherein the thin-film of $NiO_x$ is disposed on the cathode by thermally decomposing a nickel carbonyl coated thin nickel foil in an oxygen atmosphere, wherein $0.1<x<1$.

16. The method recited in claim 13, wherein said step of disposing the electrolyte between said cathode and said anode comprises the step of impregnating each of the anode and cathode by repeatedly dipping and drying each of the anode and cathode in a solution of the blend of said acid and the organic base polymer.

17. A battery comprising:
   a cathode comprised of an electro-active material;
   a metal hydride anode;
   a proton-conducting solid organic electrolyte, disposed between the cathode and the anode; and
   a case enclosing said cathode, anode and electrolyte, wherein said cathode provides a proton to said proton-conducting solid organic electrolyte during a battery charging operation, and the valency of the electro-active material of said cathode changes upon charging and discharging the battery, wherein said proton-conducting solid organic electrolyte is a nonaqueous electrolyte.

18. The battery as recited in claim 17, wherein said case hermetically seals the battery.

19. The battery as recited in claim 17, wherein the cathode, anode, and solid organic electrolyte are formed in one of a coiled fashion, a prismatic fashion, and as a flat plate.

20. The battery as recited in claim 17, wherein the cathode, anode, and solid organic electrolyte form a cell, and a plurality of the cells are contained within the case in a bipolar configuration.

21. The battery as recited in claim 1, wherein upon discharge or charge of the battery said cathode electroactive material undergoes a chemical change.

22. The battery as recited in claim 4, wherein said porous protective member has a thickness of approximately 25–50 microns, reduces mass transfer polarization and allows conduction of a proton through said porous protective member.

23. The battery as recited in claim 9, wherein said molecule of said acid is ionized in the nonaqueous proton-conducting solid organic electrolyte.

* * * * *